(12) United States Patent
Lee

(10) Patent No.: US 8,243,147 B2
(45) Date of Patent: Aug. 14, 2012

(54) HANDSHAKE CORRECTION APPARATUS

(75) Inventor: Seung-hwan Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 12/835,831

(22) Filed: Jul. 14, 2010

(65) Prior Publication Data

US 2011/0013030 A1    Jan. 20, 2011

(30) Foreign Application Priority Data

Jul. 17, 2009  (KR) .................. 10-2009-0065479

(51) Int. Cl.
*H04N 9/04* (2006.01)
*H04N 5/228* (2006.01)

(52) U.S. Cl. ................. 348/208.2; 348/207.99

(58) Field of Classification Search ............ 348/207.99, 348/208.6, 208.14, 208.13, 208.2, 208.3, 348/208.1, 208.5, 255, 294; 310/12.05, 12.06; 359/554, 557; 396/55
See application file for complete search history.

(56) References Cited

U.S. PATENT DOCUMENTS

| 5,266,988 | A | * | 11/1993 | Washisu | 396/55 |
| 7,577,346 | B2 | * | 8/2009 | Liao et al. | 396/55 |
| 2003/0123161 | A1 | * | 7/2003 | Ohno | 359/824 |
| 2007/0172220 | A1 | * | 7/2007 | Masuda | 396/55 |
| 2007/0297781 | A1 | * | 12/2007 | Kitano | 396/55 |

\* cited by examiner

*Primary Examiner* — Lin Ye
*Assistant Examiner* — Euel Cowan
(74) *Attorney, Agent, or Firm* — Drinker Biddle & Reath LLP

(57) ABSTRACT

A handshake correction apparatus is provided that comprises: a correction lens that is driven in a plane defined by a first axis and a second axis that are each independent; a pair of first magnets disposed at opposite sides of the correction lens for providing a driving force in a first axis direction; at least one second magnet disposed on at least one side of the correction lens for providing a driving force in a second axis direction; and driving coils disposed to face the first and second magnets for exerting electromagnetic interaction therebetween. In the handshake correction apparatus, a rotation of the correction lens is minimized to improve a controlling characteristic.

18 Claims, 5 Drawing Sheets

HANDSHAKE CORRECTION APPARATUS

CROSS-REFERENCE TO RELATED PATENT APPLICATION

This application claims the benefit of Korean Patent Application No. 10-2009-0065479, filed on Jul. 17, 2009, in the Korean Intellectual Property Office, the disclosure of which is incorporated herein in its entirety by reference.

BACKGROUND

Various embodiments of the invention relate to a handshake correction apparatus, and more particularly, to a handshake correction apparatus capable of correcting image shake caused by handshake of a user.

In general, digital cameras capture an image of a subject, convert the captured image into image data, and record the image data as a file having an appropriate format. If the captured image is affected by handshake of a user or external vibration, the captured image may be blurred, thereby having low quality.

Currently, various image stabilization techniques for automatically correcting camera shake have been developed. For example, a method of fixing an image-forming location on an image sensor by moving an optical lens in correspondence to camera shake has been considered. Controlling of the location of an optical lens is generally dependent upon translational driving of the optical lens and detecting of the location of the optical lens. However, the optical lens is vulnerable to undesirable rotation. That is, rotation of the optical lens may not be accurately measured and corrected if a separate rotation angle sensor is not used. Also, a guide that mechanically suppresses rotation may be applied; however, such a rotation restriction element reduces an acceleration performance and a response characteristic of an actuator, thereby deteriorating a correction performance. In addition, if there is a spatial restriction such as a winding barrel structure, a rotation restriction element is often not installed.

SUMMARY

Various embodiments of the invention provide a handshake correction apparatus having an improved controlling characteristic by minimizing rotation of a correction lens.

According to an embodiment, there is provided a handshake correction apparatus for correcting shake of a camera, the apparatus including: a correction lens that is driven in a plane defined by a first axis and a second axis that are each independent; a pair of first magnets disposed at opposite sides of the correction lens for providing a driving force in a first axis direction; at least one second magnet disposed on at least one side of the correction lens for providing a driving force in a second axis direction; and driving coils disposed to face the first and second magnets for exerting electromagnetic interaction therebetween.

Rotation moments generated by the pair of first magnets may be generated in directions that offset each other with respect to a center of the correction lens.

For example, the pair of first magnets may be disposed symmetrically with respect to a center of the correction lens. In this case, the pair of first magnets may have the same magnetic force.

For example, in the pair of first magnets, one magnet having a relatively high magnetic force may be disposed to be relatively closer to a center of the correction lens and the other magnet having a relatively low magnetic force may be disposed to be far from a center of the correction lens. Here, each of the pair of first magnets may be disposed at opposite sides of the correction lens by a distance spaced apart from the center in inverse proportion to the magnetic force thereof.

The at least one second magnet may be disposed on the second axis, wherein the second axis passes through a center of the correction lens.

For example, the at least one second magnet may be disposed at opposite sides of the correction lens.

For example, one of the first magnets and one of the at least one second magnets disposed at the same side of the correction lens may be formed as a combination type magnet to have opposite polarities disposed along the first axis direction and to have opposite polarities disposed along the second axis direction.

Here, one of the first magnets may be disposed at one side of the correction lens and the combination type magnet including the other one of the first magnets and one of the at least one second magnets may be disposed at the opposite side of the correction lens.

A pair of the combination type magnets including one of the first magnets and one of the at least one second magnets may be disposed at opposite sides of the correction lens.

The handshake correction apparatus may further include: a lens support plate to which the correction lens is installed and is driven in a plane defined by a first axis and a second axis; and a base for supporting the lens support plate and movement of the lens support plate.

Here, the first and second magnets and the driving coils may be disposed to face each other at the lens support plate and the base, respectively. Also, the handshake correction apparatus may further include yokes disposed to face the first and second magnets.

According to another embodiment, there is provided a handshake correction apparatus for correcting shake of a camera, the apparatus including: a lens support plate to which a correction lens is installed and is driven in a plane defined by a first axis and a second axis; a base for supporting the lens support plate and movement of the lens support plate; and magnets and driving coils disposed to face each other at the lens support plate and the base, respectively, wherein the magnets include: a pair of first magnets disposed at opposite sides of the correction lens for providing a driving force in a first axis direction; and at least one second magnet disposed on at least one side of the correction lens for providing a driving force in a second axis direction.

Rotation moments generated by the pair of first magnets may be generated in directions that offset each other with respect to a center of the correction lens.

For example, the pair of first magnets may be disposed symmetrically with respect to a center of the correction lens. Here, the pair of first magnets may have the same magnetic force.

For example, in the pair of first magnets, one magnet having a relatively high magnetic force may be disposed to be relatively closer to a center of the correction lens and the other magnet having a relatively low magnetic force may be disposed to be far from a center of the correction lens.

The at least one second magnet may be disposed on the second axis, wherein the second axis passes through a center of the correction lens.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
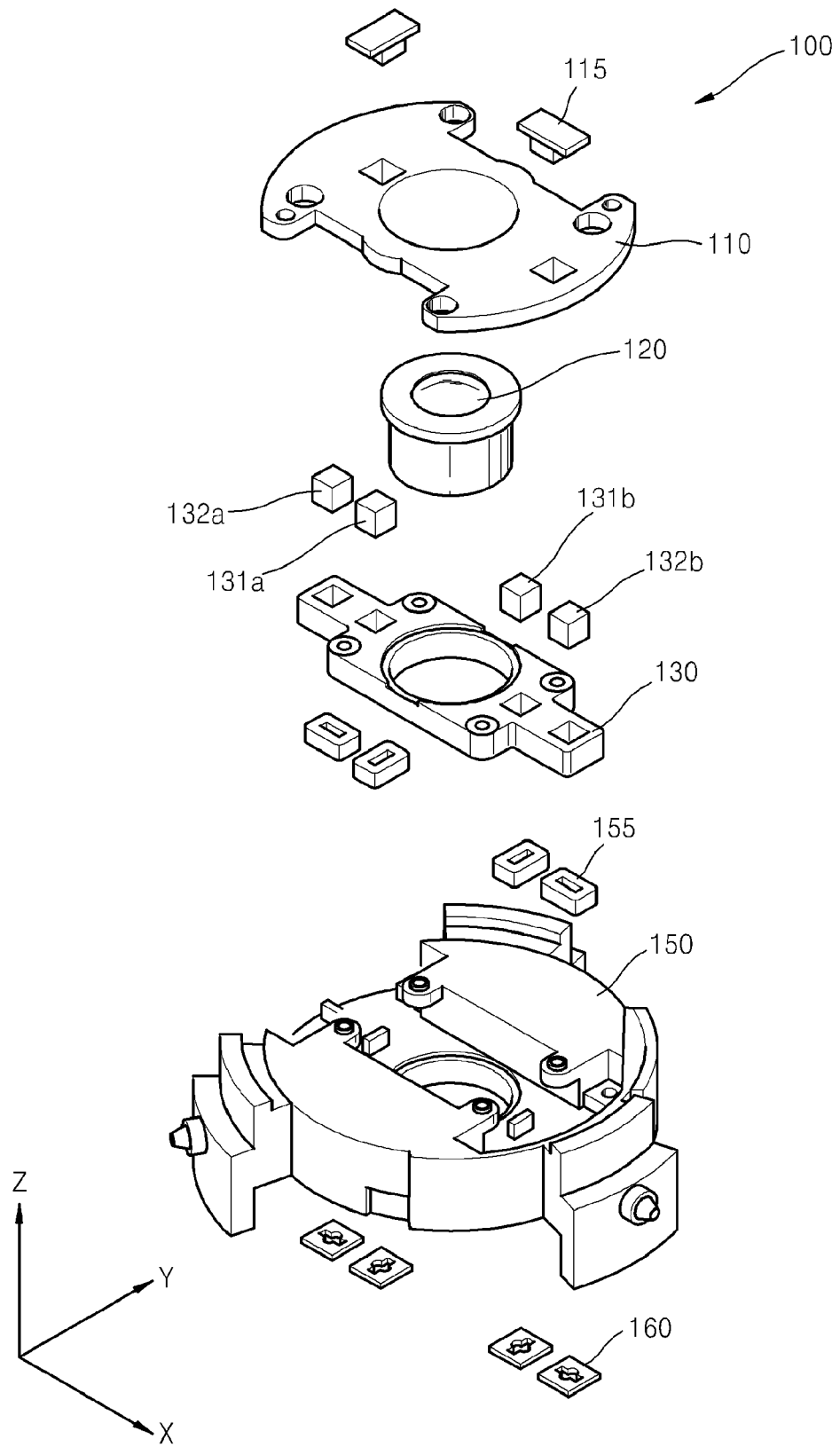
FIG. 1 is an exploded perspective view of a handshake correction apparatus according to an embodiment.
Figure 2:
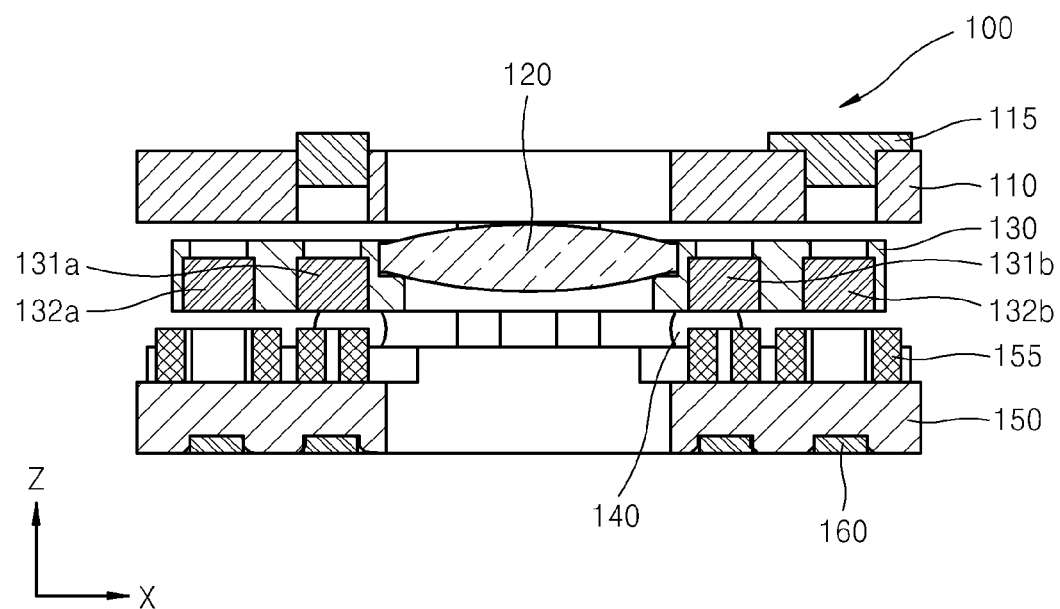
FIG. 2 is an assembled cross-sectional view of the handshake correction apparatus illustrated in FIG. 1.

Hereinafter, a handshake correction apparatus according to one or more embodiments will be described in detail with reference to the attached drawings. FIG. 1 is an exploded perspective view of a handshake correction apparatus 100 according to an embodiment. FIG. 2 is an assembled cross-sectional view of the handshake correction apparatus 100 illustrated in FIG. 1. The handshake correction apparatus 100 includes a correction lens 120, a lens support plate 130, and a base 150 for supporting the lens support plate 130.

A first pair of magnets 131a and 131b and a second pair of magnets 132a and 132b are respectively assembled at opposite side of the lens support plate 130, and driving coils 155 and yokes 160 are respectively assembled above and below the base 150 to face the magnets 131a, 131b, 132a, and 132b. For example, the driving coils 155 and the yokes 160 may be respectively assembled on a top surface and a bottom surface of the base 150 to face the magnets 131a, 131b, 132a, and 132b.

Since the magnets 131a, 131b, 132a, and 132b and the driving coils 155 are assembled to face each other, electromagnetic interactions occurs therebetween, and thus the magnets 131a, 131b, 132a, and 132b and the driving coils 155 form a voice coil motor (VCM) actuator. Opposite ends of each of the driving coils 155 may be connected to a circuit substrate (not shown) for applying a control signal. The lens support plate 130 is driven in a plane defined by a first axis and a second axis (an X-Y axis plane) perpendicular to an optical axis (Z-axis), and performs a correction operation, according to the electromagnetic interactions between the magnets 131a, 131b, 132a, and 132b and the driving coils 155.

The magnets 131a, 131b, 132a, and 132b and the yokes 160 are assembled to face each other, and exert a magnetic force with respect to each other. Thus, the lens support plate 130 and the base 150 are close to each other by the magnetic force between the magnets 131a, 131b, 132a, and 132b and the yokes 160, and when a driving power is cut off, a center of each of the magnets 131a, 131b, 132a, and 132b is matched with a center of each of the yokes 160 to return the lens support plate 130 to its original position. Moreover, the lens support plate 130 and the base 150 are disposed to face each other with ball bearings 140 (see FIG. 2) interposed therebetween. Thus, the lens support plate 130 supported by the base 150 via the ball bearings 140 is moved in the plane defined by the first axis and the second axis (the X-Y axis plane).

A cover 110 may be disposed on a top part of the handshake correction apparatus 100. The cover 110 is assembled above the base 150 with the lens support plate 130 interposed between the cover 110 and the base 150. A hall sensor 115 is assembled in the cover 110 to detect the position of the correction lens 120. The hall sensor 115 is positioned to face the magnets 131a, 131b, 132a, and 132b, and senses changes in magnetic fields of the magnets 131a, 131b, 132a, and 132b, thereby enabling detection of displacement of the correction lens 120, when moved together with the magnets 131a, 131b, 132a, and 132b.

In order to correct image shake caused by handshake, the correction lens 120 detects movement of an image forming position of a subject while moving in the plane defined by the first axis and the second axis (the X-Y axis plane) and performs a correction operation for fixing the image forming position of a subject. For example, the VCM actuator, formed of the magnets 131a, 131b, 132a, and 132b and the driving coils 155, may be controlled by a driving signal to move the correction lens 120 from a current position as detected by the hall sensor 115 to a target position to offset handshake.

Figure 3:
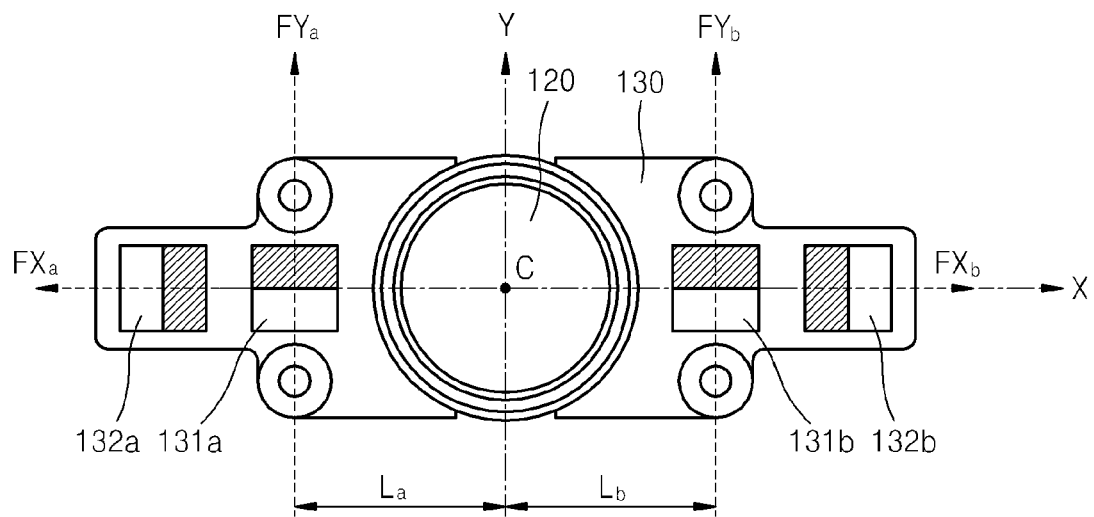
FIG. 3 is a top view of the handshake correction apparatus of FIG. 1 illustrating an arrangement of magnets applied thereto according to an embodiment.

FIG. 3 is a top view of the handshake correction apparatus 100 of FIG. 1 illustrating an arrangement of the magnets 131a, 131b, 132a, and 132b. Referring to FIG. 3, the correction lens 120 may be assembled as a center of the lens support plate 130. The first pair of magnets 131a and 131b provide driving forces FYa and FYb in a first axis direction and may be respectively arranged at opposite sides of the correction lens 120. Also, the second pair of magnets 132a and 132b provide driving forces FXa and FXb in a second axis direction may be arranged outside of the first pair of magnets 131a and 131b, respectively. The first and second magnets 131a, 131b, 132a, and 132b provide the driving forces FYa, FYb, FXa, and FXb through the electromagnetic interactions with the driving coils 155 that face the first and second magnets 131a, 131b, 132a, and 132b. The first magnets 131a and 131b have opposite polarities disposed along the first axis direction and provide the driving forces FYa and FYb in the first axis direction. The second magnets 132a and 132b have opposite polarities disposed along the second axis direction and provide the driving forces FXa and FXb in the second axis direction.

The first and second magnets 131a, 131b, 132a, and 132b each independently provide the driving forces FYa, FYb, FXa, and FXb in the first axis or second axis directions. Here, the term "each independently" denotes that the driving forces FYa and FYb in the first axis direction displaces the correction lens 120 in the first axis direction (Y-axis) in the plane defined by the first axis and the second axis (the X-Y axis plane) without displacing the correction lens 120 in the second axis (X-axis) direction. Conversely, the driving forces FXa and FXb in the second axis direction displaces the correction lens 120 in the second axis direction (X-axis) in the plane defined by the first axis and the second axis plane (the X-Y axis plane) without displacing the correction lens 120 in the first axis (Y-axis) direction. The first axis (Y-axis) and the second axis (X-axis) may be orthogonal to each other.

The driving forces FYa and FYb in the first axis direction (Y-axis) generated by the pair of first magnets 131a and 131b are exerted in directions that are parallel to each other and have points of action that are on opposite sides of the correction lens 120. Accordingly, the driving forces FYa and FYb in the first axis direction cooperate with each other for translational displacement, and rotation moments in rotation directions due to the driving forces FYa and FYb offset each other. For example, the driving force FYa generates a rotation moment in one rotation direction with respect to a lens center C of the correction lens 120 with a rotation arm La and the driving force FYb generates a rotation moment in the opposite rotation direction with respect to the lens center C with a rotation arm Lb. Here, on the assumption that the magnitudes of the driving forces FYa and FYb are the same as each other, the pair of first magnets 131a and 131b are arranged to be symmetrically disposed with respect to the lens center C (La=Lb) so that the rotation moments caused by the driving forces FYa and FYb in the first axis direction offset each other and rotation of the correction lens 120 may be prevented.

The second magnets 132*a* and 132*b* are disposed on the second axis (X-axis), wherein the second axis (X-axis) passes through the lens center C. The second magnets 132*a* and 132*b* also provide the driving forces FXa and FXb in the second axis direction (X-axis). The driving forces FXa and FXb in the second axis direction (X-axis) generated by the second magnets 132*a* and 132*b* do not have a rotation arm with respect to the lens center C and thus do not generate a rotation moment.

As described above, rotation of the correction lens 120 is prevented in the arrangement of the first and second magnets 131*a*, 131*b*, 132*a*, and 132*b*. Accordingly, a separate rotation angle sensor to measure and correct rotation may not be necessary, and the position of the correction lens 120 may be accurately controlled, thereby performing an accurate correction operation.

Figure 4:
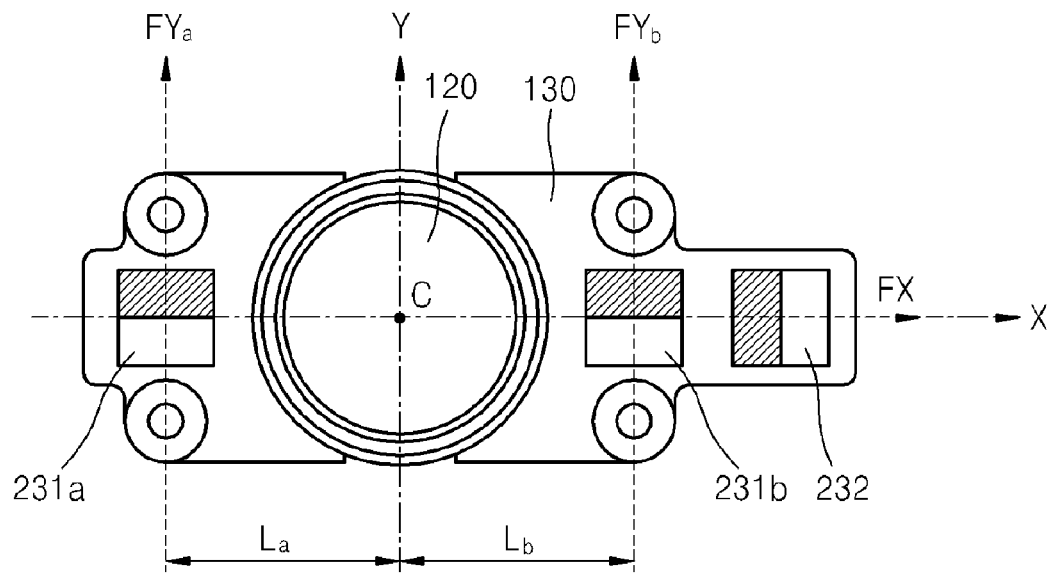
FIGS. 4 through 8 are top views of handshake correction apparatuses according to other embodiments illustrating different arrangements of magnets applied thereto.

FIG. 4 is a top view of a handshake correction apparatus according to another embodiment illustrating an arrangement of a pair of first magnets 231*a* and 231*b* and a second magnet 232. Referring to FIG. 4, the pair of first magnets 231*a* and 231*b* provide the driving forces FYa and FYb in the first axis direction and are respectively assembled at opposite sides of the correction lens 120. Also, the second magnet 232 provides a driving force FX in the second axis direction and is disposed at one side of the correction lens 120. The first and second magnets 231*a*, 231*b*, and 232 provide the driving forces FYa, FYb, and FX in the first axis and second axis directions, each independently through electromagnetic interactions with the driving coils 155 facing the first and second magnets 231*a*, 231*b*, and 232. The rotation moments in the rotation directions due to the driving forces FYa and FYb in the first axis direction generated by the pair of first magnets 231*a* and 231*b* offset each other. Here, the pair of first magnets 231*a* and 231*b* are arranged to be symmetrically disposed with respect to the lens center C (La=Lb) so that the rotation moments caused by the driving forces FYa and FYb in the first axis direction offset each other and rotation of the correction lens 120 may be prevented.

The second magnet 232 is disposed on the second axis (X-axis), which passes through the lens center C. The second magnet 232 also provides the driving force FX in the second axis (X-axis) direction. The driving force FX in the second axis direction generated by the second magnet 232 does not have a rotation arm with respect to the lens center C and does not generate a rotation moment. In the current embodiment, the second magnet 232 is disposed only at one side of the lens center C so that a structure of an actuator including the second magnet 232 may be simplified.

Figure 5:
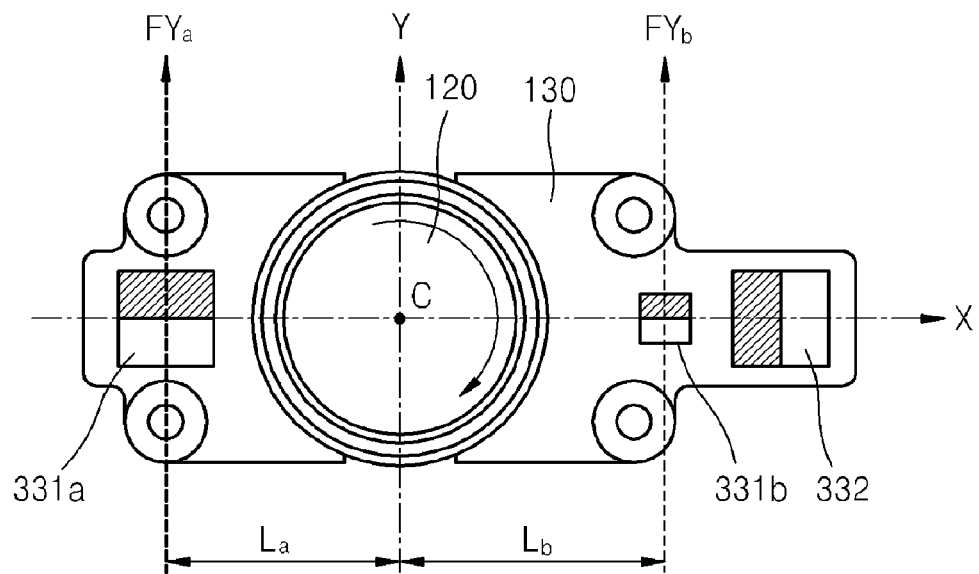

FIG. 5 is a top view of a handshake correction apparatus according to another embodiment illustrating an arrangement of a pair of first magnets 331*a* and 331*b* and a second magnet 332. Referring to FIG. 5, the pair of first magnets 331*a* and 331*b* provide the driving forces FYa and FYb in the first axis direction and are respectively assembled at opposite sides of the correction lens 120. Also, the second magnet 332 provides the driving force FX in the second axis direction is disposed at one side of the correction lens 120. The first and second magnets 331*a*, 331*b*, and 332 provide the driving forces FYa, FYb, and FX in the first axis and second axis directions, each independently through electromagnetic interactions with the driving coils 155 facing the first and second magnets 331*a*, 331*b*, and 332. The driving forces FYa and FYb in the first axis direction generated by the pair of first magnets 331*a* and 331*b* are exerted in directions that are parallel to each other and have points of action that are on opposite sides of the correction lens 120. Accordingly, the driving forces FYa and FYb in the first axis direction cooperate with each other for translational displacement, and the rotation moments in the rotation directions due to the driving forces FYa and FYb offset each other.

On the assumption that the magnitudes of the driving forces FYa and FYb provided by the pair of first magnets 331*a* and 331*b* are different from each other, the rotation arms La and Lb with respect to the lens center C to the magnets 331*a* and 331*b*, respectively, are different according to the magnitudes of the driving forces FYa and FYb so that the rotation moments due to the driving forces FYa and FYb in the first axis direction efficiently offset each other. More specifically, the rotation arm La of the first magnet 331*a* providing a relatively high magnetic force is disposed relatively closer to the lens center C, whereas the rotation arm Lb of the first magnet 331*b* providing a relatively low magnetic force is disposed relatively far from the lens center C, so that the rotation moments may efficiently offset each other. The rotation moments are products of the driving forces FYa and FYb in the first axis direction and the lengths of the rotation arms La and Lb with respect to the lens center C and thus the rotation arms La and Lb are different from each other according to a difference between the magnitudes of the driving forces FYa and FYb in the first axis direction generated from opposite sides of the correction lens 120 (La<Lb). For example, the distances La and Lb may be set differently in inverse proportion to the magnitudes of the driving forces FYa and FYb.

The second magnet 332 is disposed on the second axis (X-axis), which passes through the lens center C. Accordingly, the driving force FX in the second axis direction generated by the second magnet 332 does not have a torque arm with respect to the lens center C and does not generate a rotation moment.

Figure 6:
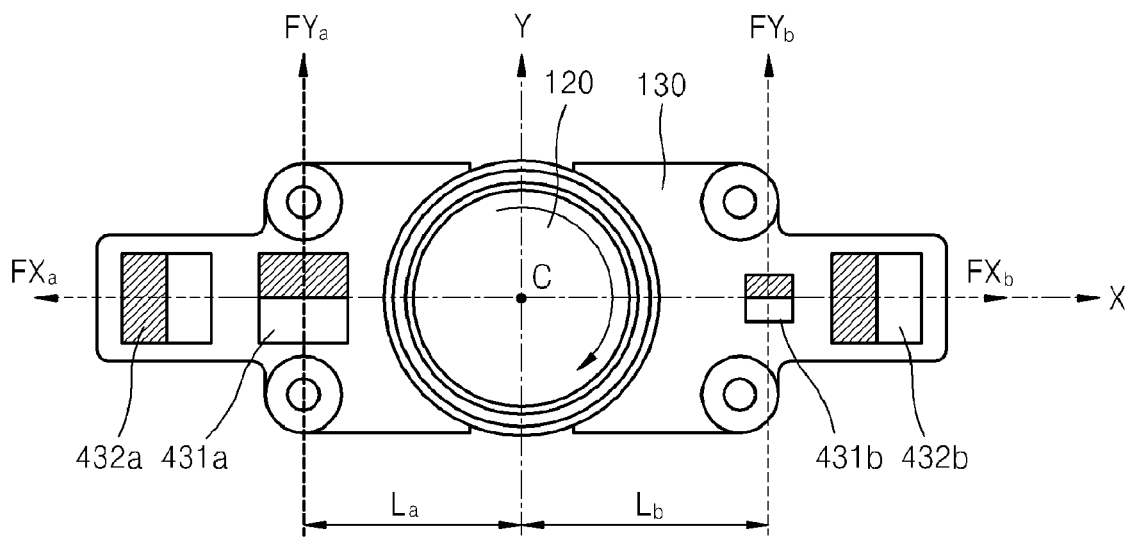

FIG. 6 is a top view of a handshake correction apparatus according to another embodiment illustrating an arrangement of a pair of first magnets 431*a* and 431*b* and a pair of second magnets 432*a* and 432*b*. Referring to FIG. 6, the pair of first magnets 431*a* and 431*b* provide the driving forces FYa and FYb in the first axis direction and are respectively assembled at opposite sides of the lens center C. Also, the pair of second magnets 432*a* and 432*b* provide the driving forces FXa and FXb in the second axis direction and are respectively assembled at opposite sides of the lens center C. On the assumption that the magnitudes of the driving forces FYa and FYb of the pair of first magnets 431*a* and 431*b* are different from each other, the rotation arms La and Lb with respect to the lens center C to the first magnets 431*a* and 431*b*, respectively, are different (La<Lb) according to the magnitudes of the driving forces FYa and FYb so that the rotation moments due to the driving forces FYa and FYb in the first axis direction efficiently offset each other.

The second magnets 432*a* and 432*b* are disposed on the second axis (X-axis), which passes through the lens center C, and thus do not have a rotation arm with respect to the lens center C and do not generate a rotation moment. In the current embodiment, the pair of second magnets 432*a* and 432*b* are disposed at opposite sides of the lens center C to obtain a rapid response characteristic by doubling the magnitude of the driving forces FXa and FXb in the second axis direction. Also, the driving forces FXa and FXb in the second axis direction are balanced based on the lens center C so that a controlling characteristic of the second axis direction (X-axis) may be improved.

Figure 7:
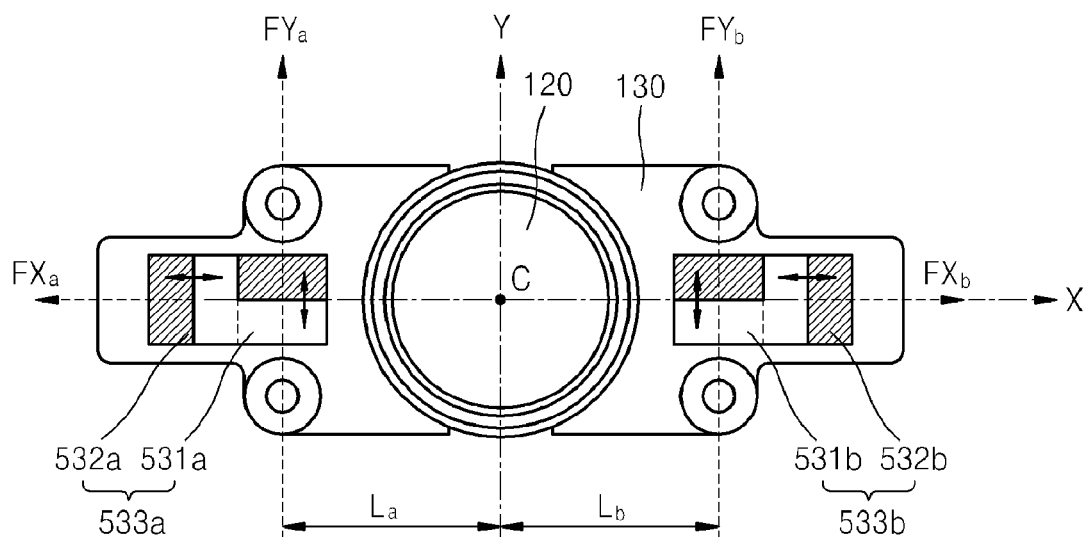

FIG. 7 is a top view of a handshake correction apparatus according to another embodiment illustrating an arrangement of two-axes driving magnets 533a and 533b. Referring to FIG. 7, the two-axes driving magnets 533a and 533b provide the driving forces FYa, FYb, FXa, and FXb, which are each independent, in the first axis direction and the second axis direction, wherein FYa and FXa are provided together by 533a and FYb and FXb are provided together by 533b, and are respectively assembled at opposite sides of the lens center C. The two-axes driving magnets 533a and 533b may both have opposite polarities along the first axis (Y-axis) direction and the second axis (X-axis) direction by using one combined magnet. That is, the two-axes driving magnets 533a and 533b may be driven to the first axis (Y-axis) direction by using first magnetic elements 531a and 531b having opposite polarities disposed along the first axis (Y-axis) direction and may be driven to the second axis (X-axis) direction by using second magnetic elements 532a and 532b having opposite polarities disposed along the second axis (X-axis) direction.

On the assumption that the magnitudes of the driving forces FYa and FYb of the first magnetic elements 531a and 531b are the same as each other, the first magnetic elements 531a and 531b are arranged to be symmetrically disposed with respect to the lens center C (La=Lb) so that the rotation moments due to the driving forces FYa and FYb of the first magnetic elements 531a and 531b may offset each other. Also, the second magnetic elements 532a and 532b are disposed on the second axis (X-axis), which passes through the lens center C, and thus do not have a torque arm and do not generate a rotation moment.

Figure 8:
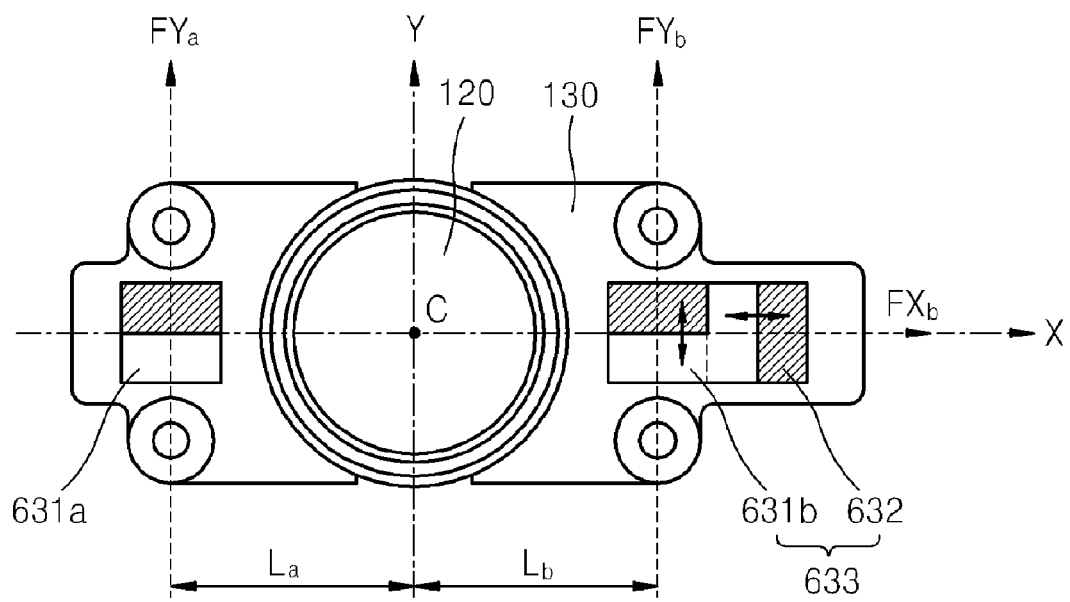

FIG. 8 is a top view of a handshake correction apparatus according to another embodiment illustrating an arrangement of a first magnet 631a and a two-axes driving magnet 633. Referring to FIG. 8, the first magnet 631a provides the driving force FYa in the first axis direction and is disposed at one side of the correction lens 120 and the two-axes driving magnet 633 provide the driving forces FYb and FX in the first axis direction and the second axis direction is disposed on the opposite side of the correction lens 120. The two-axes driving magnet 633 may both have opposite polarities along the first axis (X-axis) direction and the second axis (Y-axis) direction by using one combined magnet. More specifically, the two-axes driving magnet 633 may be driven to the first axis (X-axis) direction by using first magnetic element 631b having opposite polarity, disposed along the first axis (Y-axis) direction and may be driven to the second axis (X-axis) direction by using second magnetic element 632 having opposite polarity, disposed along the second axis (X-axis) direction.

The driving forces FYb and FX in the first axis direction generated by the first magnet 631a and the first magnetic element 631b are exerted in directions that are parallel to each other and have points of action that are opposite to each other with respect to the correction lens 120. Accordingly, the driving forces FYa and FYb in the first axis direction cooperate with each other for translational displacement, and the rotation moments in rotational direction offset each other. On the assumption that the magnitudes of the magnetic forces Fya and Fyb of the first magnet 631a and the first magnetic element 631b are the same as each other, the first magnet 631a and the first magnetic element 631b are arranged to be symmetrically disposed with respect to the lens center C so that the rotation moments due to the driving forces FYa and FYb may offset each other. That is, the first magnet 631a and the first magnetic element 631b are located at the same distances (La=Lb), respectively, from the lens center C. The second magnetic element 632 is disposed on the second axis (X-axis), which passes through the lens center C, and thus, does not have a rotation arm and does not generate a rotation moment.

The handshake correction apparatus 100 may be installed in a barrel structure including a protruding-type barrel structure, in which a barrel assembly is in/out thereof according to an on/off state of a camera, and a winding barrel structure, in which an optical system arranged perpendicular to an incident direction of a subject image is included. In particular, the handshake correction apparatus 100 may be suitable for the winding barrel structure, in which spatial restriction exists, and thus, a separate rotation restriction element for restricting a rotation of the correction lens 120 may not be installed.

According to the handshake correction apparatus described above, an arrangement of the magnets included in the VCM actuator is improved to efficiently offset moments causing a rotation of the correction lens and to minimize rotation of the correction lens. Also, rotation, which is not often controlled, is prevented so that a control characteristic of a correction apparatus may be improved and control precision of a correction operation may be improved. In addition, correction failures accompanying with incorrect correction operations such as image distortion or defocus may be efficiently prevented. In particular, rotation restriction elements for forcibly restricting rotation of the correction lens or additional elements such as a rotation angle sensor are not required so that the handshake correction apparatus may be suitable for a winding barrel structure having a spatial restriction.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components configured to perform the specified functions. The particular implementations shown and described herein are illustrative examples of the invention and are not intended to otherwise limit the scope of the invention in any way. For the sake of brevity, conventional electronics, control systems, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are intended to be used generally and are not limited solely to mechanical embodiments. Numerous modifications and adaptations will be readily apparent to those skilled in this art without departing from the spirit and scope of the present invention.

What is claimed is:

1. A handshake correction apparatus for correcting shake of a camera, the apparatus comprising:
   a correction lens that is driven in a plane defined by a first axis and a second axis that are each independent;
   a pair of first magnets disposed at opposite sides of the correction lens for providing a driving force in a first axis direction;
   at least one second magnet disposed on at least one side of the correction lens for providing a driving force in a second axis direction; and
   driving coils disposed to face the first and second magnets for exerting electromagnetic interaction therebetween;
   wherein each of the pair of first magnets and the at least one second magnet are disposed on a straight line that goes through the center of the correction lens, and
   wherein, in the pair of first magnets, one magnet having a relatively high magnetic force is disposed to be relatively closer to the center of the correction lens and the other magnet having a relatively low magnetic force is disposed to be far from the center of the correction lens.

2. The apparatus of claim 1, wherein rotation moments generated by the pair of first magnets are generated in directions that offset each other with respect to the center of the correction lens.

3. The apparatus of claim 1, wherein the pair of first magnets are disposed symmetrically with respect to the center of the correction lens.

4. The apparatus of claim 1, wherein the pair of first magnets have a same magnetic force.

5. The apparatus of claim 1, wherein each of the pair of first magnets are disposed at opposite sides of the correction lens by a distance spaced apart from the center in inverse proportion to the magnetic force thereof.

6. The apparatus of claim 1, wherein the at least one second magnet is disposed on the second axis, wherein the second axis passes through a center of the correction lens.

7. The apparatus of claim 1, wherein the at least one second magnet is disposed at opposite sides of the correction lens.

8. The apparatus of claim 1, wherein one of the first magnets and one of the at least one second magnet disposed at the same side of the correction lens is formed as a combination type magnet to have opposite polarities disposed along the first axis direction and to have opposite polarities disposed along the second axis direction.

9. The apparatus of claim 8, wherein one of the first magnets is disposed at one side of the correction lens and the combination type magnet including the other one of the first magnets and one of the at least one second magnet is disposed at the opposite side of the correction lens.

10. The apparatus of claim 8, wherein a pair of the combination type magnets including one of the first magnets and one of the at least one second magnet are disposed at opposite sides of the correction lens.

11. The apparatus of claim 1, further comprising:
    a lens support plate to which the correction lens is installed and is driven in a plane defined by a first axis and a second axis; and
    a base for supporting the lens support plate and movement of the lens support plate.

12. The apparatus of claim 11, wherein the first and second magnets and the driving coils are disposed to face each other at the lens support plate and the base, respectively.

13. The apparatus of claim 11, further comprising yokes disposed to face the first and second magnets.

14. A handshake correction apparatus for correcting shake of a camera, the apparatus comprising:
    a lens support plate to which a correction lens is installed and is driven in a plane defined by a first axis and a second axis;
    a base for supporting the lens support plate and movement of the lens support plate; and
    magnets and driving coils disposed to face each other at the lens support plate and the base, respectively
    wherein the magnets comprise:
    a pair of first magnets disposed at opposite sides of the correction lens for providing a driving force in a first axis direction;
    at least one second magnet disposed on at least one side of the correction lens for providing a driving force in a second axis direction; and
    each of the pair of first magnets and the at least one second magnet are disposed on a straight line that goes through the center of the correction lens, and
    wherein, in the pair of first magnets, one magnet having a relatively high magnetic force is disposed to be relatively closer to the center of the correction lens and the other magnet having a relatively low magnetic force is disposed to be far from the center of the correction lens.

15. The apparatus of claim 14, wherein rotation moments generated by the pair of first magnets are generated in directions that offset each other with respect to the center of the correction lens.

16. The apparatus of claim 14, wherein the pair of first magnets are disposed symmetrically with respect to the center of the correction lens.

17. The apparatus of claim 16, wherein the pair of first magnets have the same magnetic force.

18. The apparatus of claim 14, wherein the at least one second magnet is disposed on the second axis, wherein the second axis passes through the center of the correction lens.

* * * * *